United States Patent
Son et al.

(10) Patent No.: US 8,620,949 B2
(45) Date of Patent: Dec. 31, 2013

(54) DISPLAY APPARATUS AND CONTENTS SEARCHING METHOD THEREOF

(75) Inventors: Yong-man Son, Suwon-si (KR); Kum-yon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 13/169,185

(22) Filed: Jun. 27, 2011

(65) Prior Publication Data

US 2012/0143902 A1   Jun. 7, 2012

(30) Foreign Application Priority Data

Dec. 7, 2010 (KR) ........................ 10-2010-0123947

(51) Int. Cl.
*G06F 7/00* (2006.01)
*G06F 17/30* (2006.01)

(52) U.S. Cl.
USPC .......................................................... 707/769

(58) Field of Classification Search
USPC ............................................. 707/769, 999.003
See application file for complete search history.

(56) References Cited

U.S. PATENT DOCUMENTS

| | | | | |
|---|---|---|---|---|
| 5,809,471 | A * | 9/1998 | Brodsky | 704/275 |
| 7,007,294 | B1 * | 2/2006 | Kurapati | 725/53 |
| 2007/0236613 | A1 * | 10/2007 | Foss | 348/734 |
| 2007/0300252 | A1 * | 12/2007 | Acharya et al. | 725/25 |
| 2010/0115557 | A1 * | 5/2010 | Billmaier et al. | 725/44 |

* cited by examiner

*Primary Examiner* — Aleksandr Kerzhner
(74) *Attorney, Agent, or Firm* — Sughrue Mion, PLLC

(57) ABSTRACT

A display apparatus includes a display unit and receives a broadcasting signal, the display apparatus including: a communication unit which communicates with an external server; and an integrated searching unit which requests a broadcasting schedule information of a provider providing the broadcasting signal and a current popular search word to the server if a user inputs a search signal to execute a searching function, generates at least one recommended search word based on the broadcasting schedule information and the popular search word received from the server and displays on the display unit the generated recommended search word.

15 Claims, 6 Drawing Sheets

DISPLAY APPARATUS AND CONTENTS SEARCHING METHOD THEREOF

CROSS-REFERENCE TO RELATED APPLICATION

This application claims priority from Korean Patent Application No. 10-2010-0123947, filed on Dec. 7, 2010 in the Korean Intellectual Property Office, the disclosure of which is incorporated herein by reference, in its entirety.

BACKGROUND

1. Field

Apparatuses and methods consistent with the exemplary embodiments relate to a display apparatus and a contents searching method thereof, and more particularly, to a display apparatus and a contents searching method thereof which receives contents from the Internet.

2. Description of the Related Art

In line with technological development, electronic goods which are equipped with various functions for improved convenience and functionality have been introduced. In particular, such electronic goods have an Internet function which is backed by the development of network infrastructure and the Internet.

Out of such multi-functional electronic goods, a TV integrates an Internet access function thereinto to be connected to the Internet. Also, a TV which is connected to the Internet through a relay such as a set-top box is being released. Further, an Internet TV service which connects a TV to the Internet for viewing video online is drawing much attention from viewers. A user may view multimedia contents stored in a server of an Internet TV service provider from his/her TV.

As such, a user may now enjoy various multimedia contents by using the TV supporting the Internet service.

To that end, a method for easily searching contents on the Internet or contents through other means than the Internet access should be provided.

SUMMARY

One or more exemplary embodiments may provide a display apparatus and a contents searching method thereof which provides a recommended search word relating to a broadcasting signal received from a set-top box.

An exemplary embodiment may provide a display apparatus and a contents searching method thereof which easily searches contents through a plurality of application units providing contents.

Still another exemplary embodiment may provide a display apparatus and a contents searching method thereof which easily searches contents with respect to an application unit that does not provide a searching function.

An aspect of an exemplary embodiment provides a display apparatus which includes a display unit and receives a broadcasting signal from a set-top box, the display apparatus including: a communication unit which communicates with an external server; and an integrated searching unit which requests broadcasting schedule information of a provider providing the broadcasting signal and a current popular search word to the server if a user inputs a search signal to execute a searching function, generates at least one recommended search word based on the broadcasting schedule information and the popular search word received from the server and displays on the display unit the generated recommended search word.

The integrated searching unit may identify location information of the display apparatus based on an Internet protocol, and display on the display unit information on at least one provider providing the broadcasting signal based on the location information, and request broadcasting schedule information of the selected provider to the server if a user's selection of one of the providers is received.

The integrated searching unit may generate the recommended search word from information jointly included in the broadcasting schedule information and the popular search word.

The display apparatus further includes a plurality of application units providing contents, wherein the integrated searching unit may control the plurality of application units to search contents relating to the selected, recommended search word if a user selects one of the recommended search words and display contents searched by the application units, on the display unit.

The integrated searching unit may display on the display unit a search list of the searched contents.

The integrated searching unit may control the application units to execute a selected content if the content is selected from the search list.

An aspect of an exemplary embodiment provides a contents searching method of a display apparatus, the method including: receiving a broadcasting signal from a set-top box; receiving a search signal from a user to execute a searching function; requesting broadcasting schedule information of a provider providing the broadcasting signal and a current popular search word to an external server; generating at least one recommended search word based on the broadcasting schedule information and the popular search word received from the server; and displaying the generated, recommended search word.

An aspect of an exemplary embodiment provides a contents searching method of a display apparatus, the method including: receiving a search signal from a user to execute a searching function; requesting a broadcasting schedule information from a provider providing a broadcasting signal current being displayed and a current popular search word from an external server; generating a plurality of recommended search words based on the broadcasting schedule information and based on the popular search word received from the server; displaying the generated recommended search words; receiving a user selection from the user of one of the generated recommended search words; and displaying a plurality of contents based on the selected recommended search word.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
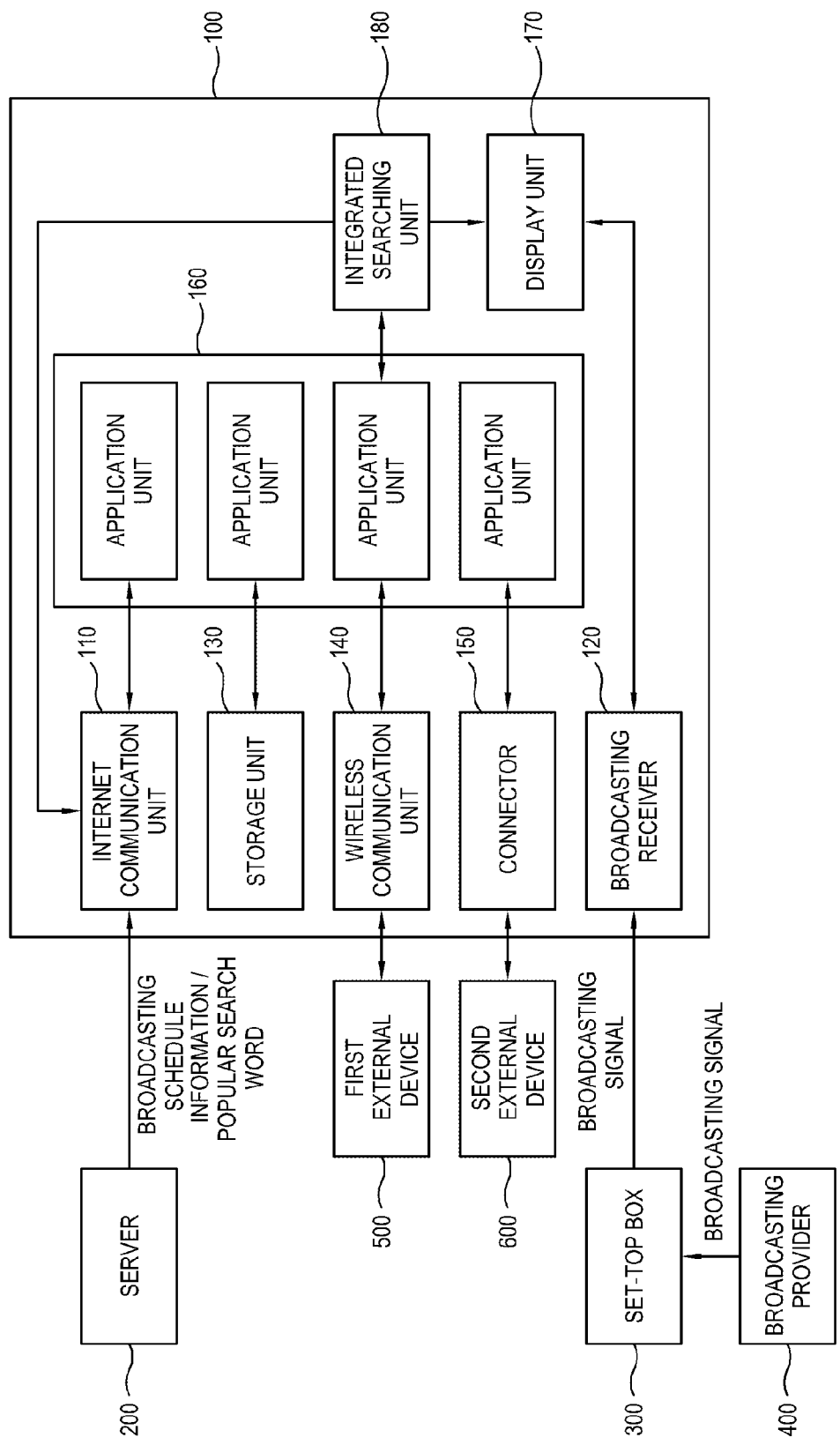
FIG. 1 is a control block diagram of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such "as least one of," when preceding a list of elements modify the entire list and not the individual elements of the list.

FIG. 1 is a control block diagram of a display apparatus according to an exemplary embodiment.

As shown therein, a display apparatus 100 according to the present exemplary embodiment includes an Internet communication unit 110, a broadcasting receiver 120, a wireless communication unit 140, a connector 150, a storage unit 130, a plurality of application units 160, a display unit 170, and an integrated searching unit 180. The display apparatus 100 may include an Internet TV or a smart TV which receives various services through an Internet protocol; or a personal terminal such as, for example, a personal computer (PC), a mobile phone, a smart phone, a portable multimedia player (PMP), a netbook, a laptop computer and an e-book device. The display apparatus 100 includes any device which receives, displays and executes contents from various contents providers through the Internet connection. The display apparatus 100 according to the present exemplary embodiment receives a broadcasting signal through a relay such as a set-top box 300. The display apparatus 100 may have an application installed and executed to execute and display contents. The contents according to the present exemplary embodiment refers to all of the information which can be displayed, played and embodied by the display apparatus 100, including a broadcasting signal, a text, a photo, a still image, a video, a movie and a music.

The Internet communication unit 110 includes a communication module which is connected to the Internet network in a wired or wireless manner. The Internet communication unit 110 communicates with various contents providers to receive contents such as, for example, music files, still images, texts and videos and to transmit various control signals input by a user, to the contents providers. The Internet communication unit 110 according to the present exemplary embodiment requests broadcasting schedule information of a broadcasting provider 400 providing a broadcasting signal and a popular search word by a control of the integrated searching unit 180, to a server 200, receives such information from the server 200 and transmits the information to the integrated searching unit 180.

The server 200 includes an Internet-based contents provider which provides broadcasting schedule information of the broadcasting provider 400, popular search words and other various contents to the Internet communication unit 110 of the display apparatus 100. The server 200 may include a server of a website which provides broadcasting schedule information and a portal website which provides real-time popular search words. The server 200 may include a contents provider which provides various contents. The server 200 may include anything which provides desired contents to the display apparatus 100 through the Internet communication unit 110, and is shown as a single configuration in FIG. 1 for purposes of convenience.

The broadcasting receiver 120 includes a wired/wireless interface to receive a broadcasting signal from the set-top box 300. The broadcasting receiver 120 may include a connector to be connected to a wired cable or a type of the wireless communication unit 140 (to be described later).

The set-top box 300 may include an antenna or a tuner to receive and process a broadcasting signal from the broadcasting provider 400. The broadcasting signal may include an air-wave broadcasting, a cable broadcasting and a satellite broadcasting. The broadcasting provider 400 may include an air-wave broadcasting station, a cable broadcasting station and a satellite broadcasting station. The cable broadcasting station may include a single system operator (SSO) which operates a single broadcasting station, and a multiple system operator (MSO) which operates multiple broadcasting stations in at least two locations.

If the display apparatus 100 receives a broadcasting signal through the set-top box 300, a sound signal and an image signal of the broadcasting signal are input and played by the display apparatus 100. However, other information such as EPG information and broadcasting meta information may not be input to the display apparatus 100. If there are no clear standards for transmission of data between the set-top box 300 and the display apparatus 100 and the reception of other information is not guaranteed, the display apparatus 100 may not use other information.

The storage unit 130 includes a memory, which is provided in the display apparatus 100 to store therein contents, including still images such as, for example, photos, videos, music files and movies. The storage unit 130 may include a hard disk driver (HDD) used when a personal video recorder (PVR) function is executed, or a non-volatile memory such as a flash memory.

The wireless communication unit 140 communicates with a first external device 500 which is located remotely from the display apparatus 100 through a wireless network. The wireless communication unit 140 may include a communication module corresponding to various communication methods such as Bluetooth®, Wi-Fi™, Zigbee, infrared (IR) communication, radio frequency (RF) communication and other wired communications.

Middleware which supports a home networking to share digital contents such as music, photos, and videos stored in electronic devices such as home computers, home appliances and portable terminals includes Universal Plug and Play (UPnP), Home Audio Interoperability (HaVi), Jini, Video Electronics Standards Association (VESA), Digital Living Network Alliance (DLNA) or the like. The wireless communication unit 140 according to the present exemplary embodiment may communicate with the first external device 500 by open standards, e.g., DLNA established on the basis of the industrial standards such as HTTP, UPnP and Wi-Fi. The DLNA focuses on sharing all of contents provided by TVs, VCRs, digital cameras or audio systems. The DLNA supports acquisition, transmission and management of various digital media contents (e.g., photos, music and videos) from personal devices such as mobile devices and PCs. The wireless communication unit 140 and the first external device 500 may transmit and receive account information on contents providers through a DLNA-based networking.

The connector 150 acts as an interface to which an external connector is connected, other than the storage unit 130 of the display apparatus 100. The connector 150 may include a connection port to be connected to a second external device 600 such as a portable storage medium including a USB memory stick, or a wired network connector to be connected to the second external device 600 including a storage unit.

The application units 160 include application programs which are installed in the display apparatus 100 to execute various contents. The application units 160 search contents corresponding to a selected, recommended search word or contents including the search word by a control of the integrated searching unit 180, and execute the selected contents. The application programs may be stored during a manufacturing process of the display apparatus 100, or downloaded from contents providers through a wired or wireless Internet network. The application units 160 may include an application program which accesses a social network service (SNS) website to receive contents therefrom, an application program which is connected to an external device in a wired or wireless manner to receive contents therefrom, an application program which searches and executes a video by video on demand (VOD) service, and a browser which browses stored contents. A player which searches and plays various multimedia is also included in the application units 160. The plurality of application units 160 is displayed in a thumb nail or icon on the display unit 170.

The application units 160 may have a searching function to search contents individually. A user may search contents of a particular contents provider by selecting the application units 160. For example, if the application units 160 include an application program accessing Twitter as one of the SNS, a user may access Twitter, search a particular search word and view search results. That is, each of the application units 160 may have a searching function, respectively.

The display unit 170 displays thereon contents received from various contents sources, and a recommended search word generated by the integrated searching unit 180 and a contents list as a search result of the recommended search word. The display unit 170 includes a liquid crystal display (LCD) panel including liquid crystal, an organic light emitting diode (OLED) panel including an organic light emitting element, or a plasma display panel (PDP), and includes a panel driver to drive the panel.

The display apparatus 100 may include various signal processors (not shown) to process received contents for a display by the display unit 170. The signal processors may include an image processing block such as a decoder, a scaler and an enhancer, and a sound processing block.

The foregoing elements are divided by function to explain contents sources acquired by the display apparatus 100, but may not be divided physically. The broadcasting receiver 120 and the Internet communication unit 110 may be formed integrally, and the Internet communication unit 110 and the wireless communication unit 140 may also be formed integrally.

According to another exemplary embodiment, the Internet communication unit 110, the wireless communication unit 140, the connector 150, and the storage unit 130 may be connected to the set-top box 300. Otherwise, the Internet communication unit 110, the wireless communication unit 140, the connector 150 and the storage unit 130 may be provided in the set-top box 300 instead of the display apparatus 100. In this case, the application units 160 may search contents from various contents sources connected to the set-top box 300 or provided therein, and may execute the selected contents.

Upon receiving a search signal to execute a searching function from a user, the integrated searching unit 180 requests broadcasting schedule information of a broadcasting signal provider and a current popular search word to the server 200, and generates at least one recommended search word based on the broadcasting schedule information and the popular search word received from the server 200. Also, the integrated searching unit 180 displays the generated recommended search word on the display unit 170.

In the case of the display apparatus 100 which transmits and receives contents based on an Internet protocol, substantial location information of the display apparatus 100 may be recognized by the Internet protocol. The Internet protocol is basic information to identify a county or location where the display apparatus 100 is located currently. Upon receiving a search signal, the integrated searching unit 180 may identify the location information of the display apparatus 100 based on the Internet protocol, and determine information on at least one broadcasting provider 400 providing a broadcasting signal based on the location information. The integrated searching unit 180 may store the information on the broadcasting provider 400 corresponding to the location information of the display apparatus 100 and acquire the information on the broadcasting provider 400 from an external source such as the server 200.

Figure 2:
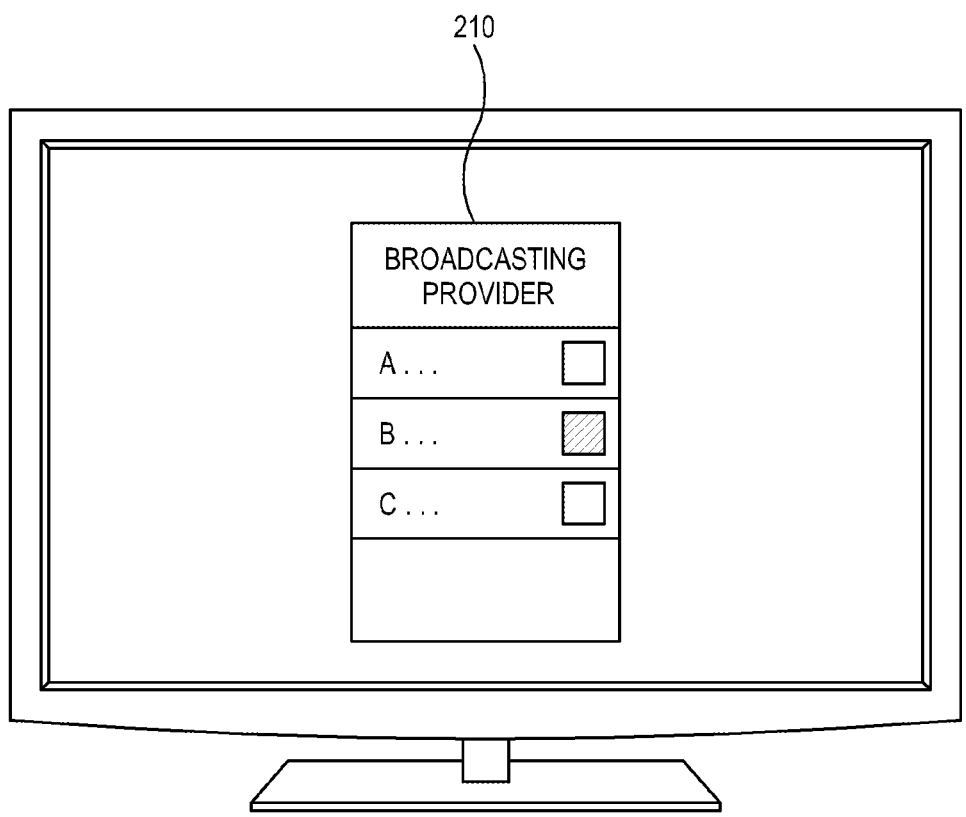
FIG. 2 illustrates a user interface (UI) for selecting a provider displayed in the display apparatus according to the exemplary embodiment.

If there is a plurality of broadcasting providers 400 corresponding to a particular location, instead of a single broadcasting provider, the integrated searching unit 180 may display on the display unit 170 the information on the broadcasting providers 400. FIG. 2 illustrates a provider selection user interface (UI) 210 which is displayed in the display apparatus 100 according to an exemplary embodiment. A user may select a particular broadcasting provider 400 of which the user is a subscriber as if selecting B in FIG. 2. The setting of the broadcasting provider 400 may be changed or deleted by a user.

Upon receiving a selection signal from a user to select one of the broadcasting providers 400, the integrated searching unit 180 requests and receives from the server 200 broadcasting schedule information of the selected broadcasting provider 400 and a real-time popular search word. The broadcasting schedule information and the popular search word may be provided by the same server 200 or by different servers 200. Typically, if a broadcasting signal is received from the set-top box 300, other information than the sound signal and image signal is not transmitted to the display apparatus 100. Thus, the integrated searching unit 180 may not provide various information based on the broadcasting signal, e.g., search word information for a user's convenience. To solve the foregoing problem and provide a user with information on a broadcasting signal which is currently viewed or is very likely to be viewed by a user, the integrated searching unit 180 requests the broadcasting schedule information to the server 200.

Figure 3:
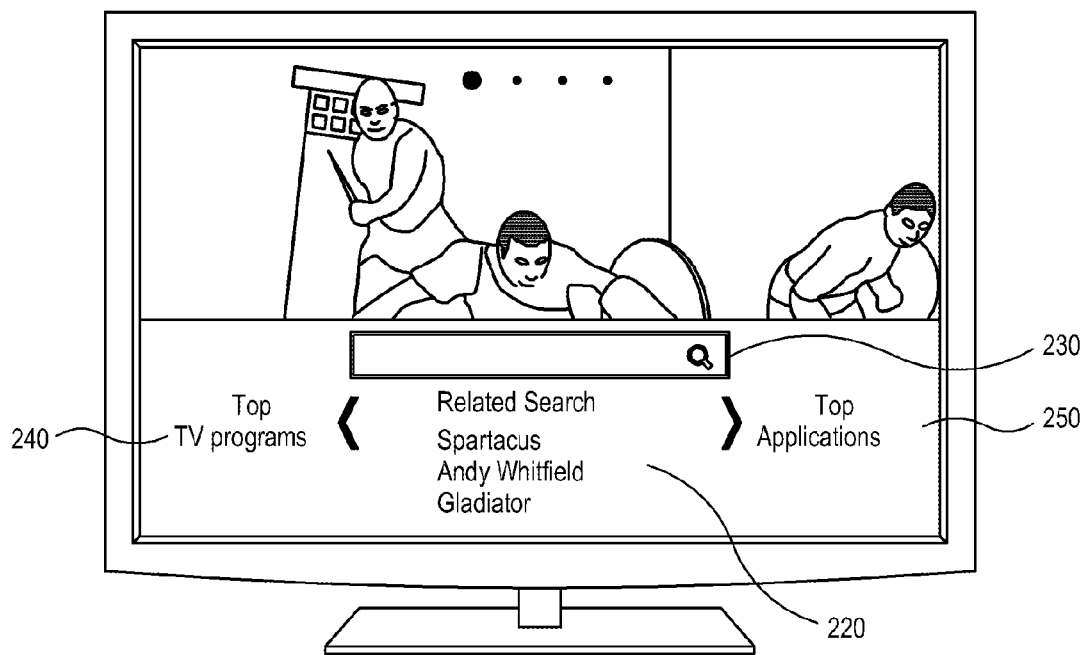
FIG. 3 illustrates a recommended search word which is displayed in the display apparatus according to the exemplary embodiment.

Upon receiving the broadcasting schedule information and the real-time popular search word, the integrated searching unit 180 generates and displays on the display unit 170 at least one recommended search word based on the received broadcasting schedule information and popular search word. Then, matching information or relevant information on broadcasting program information included in the broadcasting schedule information and the popular search words may be provided as a recommended search word. FIG. 3 illustrates a recommended search word ("Related Search") 220 which is displayed in the display apparatus 100 according to the present exemplary embodiment. As shown therein, if a user inputs a search signal, an input bar 230 to input a search word, and recommended search words 220 are displayed. The recommended search words 220 are generated on the basis of the contents currently displayed, i.e., the broadcasting schedule information of the broadcasting signal and the real-time popular search word, and thus are very likely to include a word or term, which a user wishes to search.

If the display apparatus 100 includes a TV, a user input unit typically includes a remote controller including up, down, left, and right direction buttons. The remote controller includes a touch pad or a touch screen. In the case of a touch-based interface, a direction control by a movement of touch is performed easily. To improve user's convenience and in consideration of the remote controller which is not easy to input texts, the integrated searching unit 180 provides recommended search words 220 which are expected to be searched by a user.

According to another exemplary embodiment, the integrated searching unit 180 includes a search engine, and may identify location information based on the Internet protocol and search the broadcasting schedule information or popular search words. In this case, the integrated searching unit 180 may include a storage unit to store therein various information.

The integrated searching unit 180 may receive from the server 200 and display ranking information on a source of contents to be executed by the display apparatus 100, e.g., program ranking information 240 of the broadcasting signal, ranking information 250 of the application units 160 or ranking information of issues or subjects which are most popular from the application units 160. The ranking information may be displayed in the order of relevance to the broadcasting signal currently displayed on the display unit 170.

A user may select one of the recommended search words 220 by an up and down button or up and down touch movement, and may move between the ranking information 240 and 250 and the recommended search words 220 by the left and right button or left and right touch movement.

The program ranking information or the content ranking information may not be displayed on the display unit 170. That is, such information may be selectively provided to a user.

The recommended search words 220 and the ranking information 240 and 250 may be displayed on the currently-displayed broadcasting signal with transparency, or a display area thereof may be adjusted. As shown therein, the recommended search words 220 and the ranking information 240 and 250 may be displayed in a lower part of the display unit 170 or in a picture in picture (PIP).

The integrated searching unit 180 controls the plurality of application units 160 to search contents based on the recommended search word selected by a user, and displays contents searched by the application units 160 on the display unit 170. Accordingly, a user may search all of contents which may be displayed or played by the display apparatus 100. Upon the selection of the recommended search word, the integrated searching unit 180 controls the application units 160 to perform their respective searching functions. The contents searched by the application units 160 are provided to a user through a GUI supported by the integrated searching unit 180.

Figure 4:
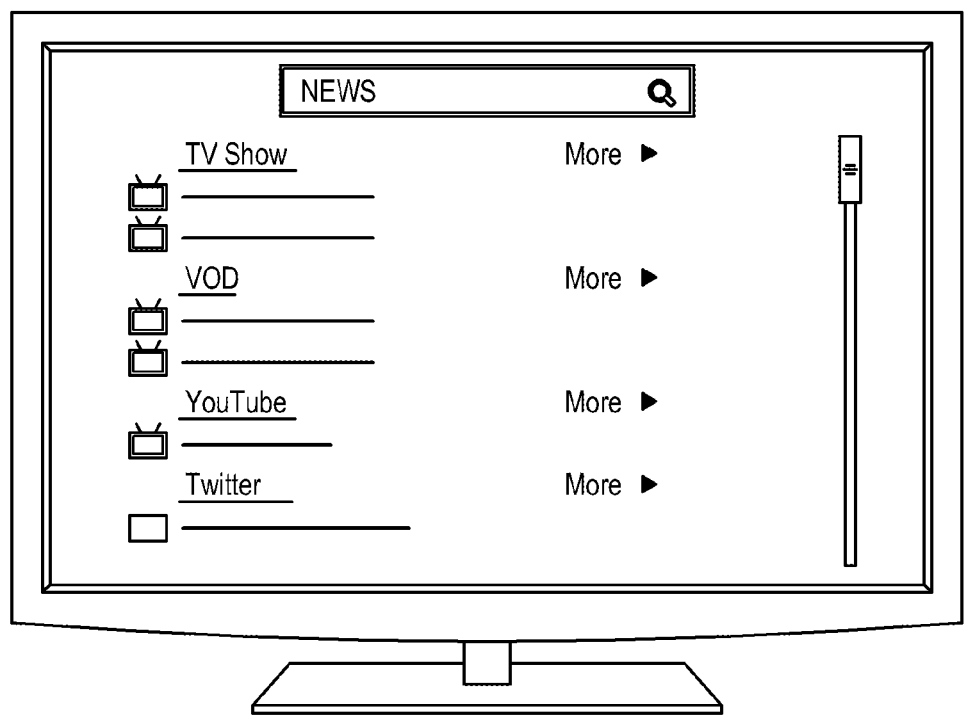
FIG. 4 illustrates an integrated search result which is displayed in the display apparatus according to the exemplary embodiment.

The integrated searching unit 180 according to the present exemplary embodiment displays on the display unit 170 a search list of searched contents. FIG. 4 illustrates integrated search results displayed on the display unit 170. As shown therein, channel items of a broadcasting program, contents items searched from the VOD, contents items searched from Youtube and items searched from Twitter are listed. Among the search results of the plurality of application units 160, a search list which is searched by the application unit 160 and most relevant to the currently-viewed content may be displayed on top of the list.

A user may acquire all of contents information relating to the search word by a single input of the search word without executing the plurality of application units 160 to search contents. That is, the display apparatus 100 which includes the plurality of application units 160 realizes an integrated search by an individual searching function of the application units 160 by a control of the integrated searching unit 180.

In addition, a user may individually execute the application units 160 to acquire search results from a particular content source.

As described above, the display apparatus 100 may further include a remote controller (not shown) which includes a direction button or direction buttons. The remote controller may include a touch pad or a touch screen, and may further include a text keyboard such as a qwerty keyboard to input texts. Otherwise, the display apparatus 100 may include a keyboard and a mouse as a user input unit.

A user may select one of the contents displayed in the search list. Then, the application units 160 execute the selected content and display the selected content on the display unit 170.

Figure 5:
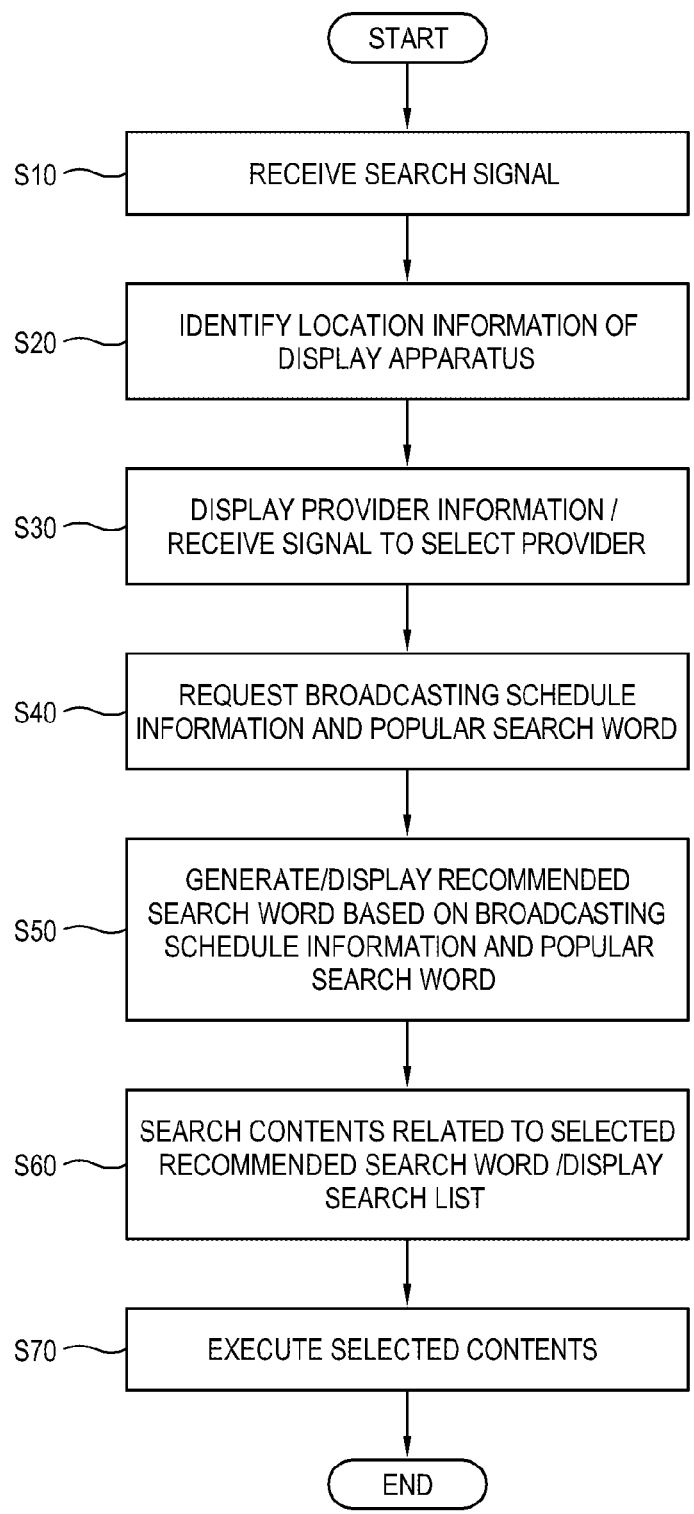
FIG. 5 is a control flowchart of a contents searching method of the display apparatus according to the exemplary embodiment.

FIG. 5 is a control flowchart of a contents searching method of the display apparatus 100 according to an exemplary embodiment. The contents searching method according to the present exemplary embodiment will be described with reference to FIG. 5.

The plurality of application units 160 which provides contents is installed by a user and a broadcasting signal is received from the set-top box 300.

Upon receiving a search signal from a user to execute the searching function (S10), the integrated searching unit 180 identifies the location information of the display apparatus 100 based on the Internet protocol (S20).

The integrated searching unit 180 identifies the broadcasting provider 400 corresponding to the location information, displays on the display unit 170 the information on the broadcasting provider 400 and receives a user's selection of one of the broadcasting providers 400 (S30).

The integrated searching unit 180 transmits the selected broadcasting provider 400 to the server 200 and requests the broadcasting schedule information and the real-time popular search word to the server 200 (S40). The integrated searching unit 180 according to the present exemplary embodiment may also request the ranking information of broadcasting programs from the server 200.

The server 200 identifies the broadcasting schedule information and the real-time popular search word by driving the search engine and provides the results to the display apparatus 100.

The integrated searching unit 180 generates at least one recommended search word 220 and displays the recommended search words 220 on the display unit 170 based on the broadcasting schedule information and the popular search word received from the server 200 (S50). The ranking information 240 and 250 may also be displayed together with the recommended search words 220.

Upon receiving a selection signal to select one of the recommended search words from a user, the integrated searching unit 180 controls the application units 160 to search contents of the recommended search word, and displays a search list (S60). The application units 160 may search contents provided by a contents provider or contents acquired by a network communication such as the DLNA or a USB storage medium. The application units 160 may search contents stored in the storage unit 130 of the display apparatus 100.

A user may select a particular content from the search list, and the application units 160 execute the selected content (S70).

According to another exemplary embodiment, contents provided by the connector 150 and contents stored in the storage unit 130 may be searched by the integrated searching unit 180 instead of by the application units 160. If a user selects a recommended search word, the integrated searching unit 180 determines whether a searching function exists, with reference to a configuration of the application units 160 installed in the display apparatus 100, and controls the application units 160 having the searching function to search contents of the recommended search word. If it is determined that there is an application program excluding the searching function, the integrated searching unit 180 may directly search the contents and display a search list of contents.

If the application units 160 are newly installed, the integrated searching unit 180 may perform an integrated search based on the configuration of the application units 160. In the case of an application program which is provided by a third party instead of a manufacturer of the display apparatus 100, it will be programmed to be accessed by the integrated searching unit 180 and to display a search result by a control of the integrated searching unit 180.

The present exemplary embodiment is similar to the foregoing exemplary embodiments in that the recommended search words are generated based on the broadcasting schedule information and the popular search word.

Figure 6:
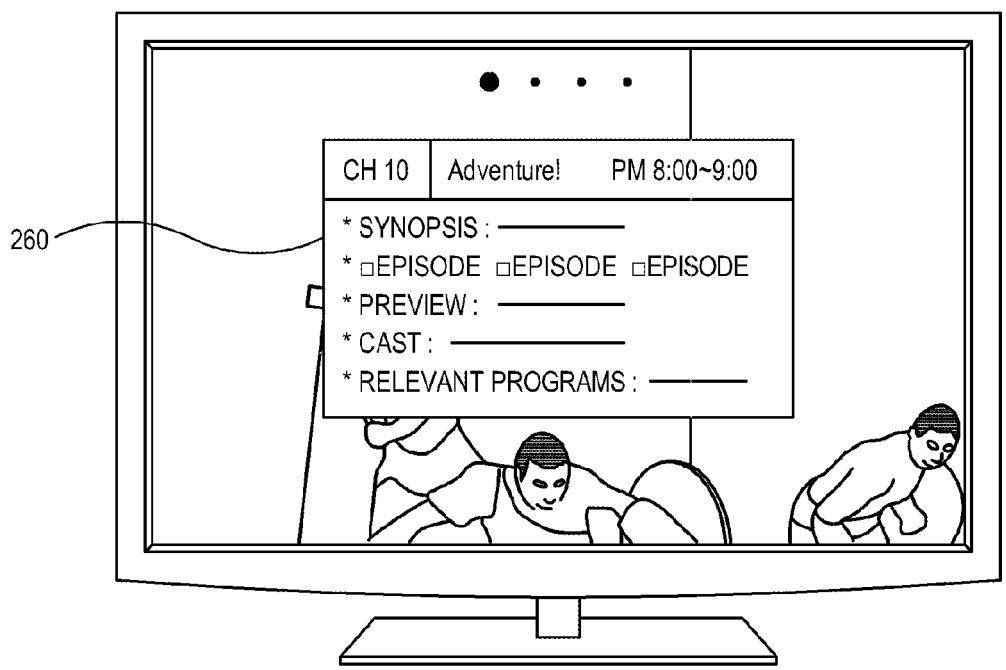
FIG. 6 illustrates additional information which is displayed in a display apparatus according to another exemplary embodiment.

FIG. 6 illustrates additional information which is displayed in a display apparatus according to another exemplary embodiment. As shown therein, the display apparatus 100 according to the present exemplary embodiment may further request additional information relating to a current broadcasting program from a server 200. If a user requests additional information relating to the broadcasting signal, the integrated searching unit 180 transmits a particular command signal to the server 200 in response to such request. The server 200 may store therein the additional information provided by the broadcasting provider 400 or may receive the additional information in real-time.

Additional information 260 on the broadcasting signal received from the server 200 is displayed on the display unit 170 as in FIG. 6. For example, the additional information 260 may include a channel number, broadcasting program title and broadcasting time of a broadcasting signal currently broadcast, a synopsis of the program and a short video such as preview. The additional information 260 may also include information on cast or producers of the broadcasting program or other relevant information. This corresponds to EPG information or similar information.

That is, according to the present exemplary embodiment, a user may acquire additional information 260 which is excluded when the broadcasting signal is received by the set-top box 300, to thereby improve user convenience and accessibility to broadcasting signals.

As described above, a display apparatus and a contents searching method thereof according to an exemplary embodiment provides a recommended search word relating a broadcasting signal received from a set-top box.

As described above, a display apparatus and a contents searching method thereof according to another exemplary embodiment easily searches contents through a plurality of application units.

Also, a display apparatus and a contents searching method thereof according to another exemplary embodiment easily searches contents with respect to an application unit which does not provide a searching function.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus which comprises a display unit and receives a broadcasting signal, the display apparatus comprising:
    a communication device which communicates with an external server of a portal website; and
    a processor, including programmed logic, to perform an integrated search by:
    identifying a location information of the display apparatus based on an Internet protocol and determining an information on at least one provider providing the broadcasting signal based on the location information;
    requesting a broadcasting schedule information from a provider providing the broadcasting signal and a real-time popular search word from the external server of the portal website when a user inputs a search signal to execute a searching function;
    generating at least one recommended search word based on the broadcasting schedule information and the popular search word received from the external server of the portal website; and
    displaying on the display unit the generated recommended search word.

2. The display apparatus according to claim 1, wherein the processor displays on the display unit the information on at least one provider providing the broadcasting signal, and requests the broadcasting schedule information of the at least one provider from the server when a user selects one of the at least one providers.

3. The display apparatus according to claim 1, wherein the recommended search word is generated from an information comprised in the broadcasting schedule information and in the popular search word.

4. The display apparatus according to claim 1, further comprising a plurality of application units providing a plurality of contents, wherein
    the processor controls the plurality of application units to individually search the plurality of contents for contents relating to a selected one among the at least one recommended search word if a user selects the selected one of the at least one recommended search words and displays, on the display unit, a resultant search list based on the contents relating to the selected recommended search word.

5. The display apparatus according to claim 4, wherein the processor displays on the display unit a search list of the contents relating to the selected recommended search word.

6. The display apparatus according to claim 5, wherein the processor controls the application units to execute a selected content if one of the contents relating to the selected recommended search word is selected from the search list.

7. The display apparatus according to claim 1, wherein the at least recommended search word comprises a plurality of recommended search words, and the integrated searching unit receives a user selection of one of the plurality of recommended search words.

8. A contents searching method of a display apparatus, the method comprising:
    receiving a broadcasting signal;

receiving a search signal from a user to execute a searching function;

identifying a location information of the display apparatus based on an Internet protocol and determining an information on at least one provider providing the broadcasting signal based on the location information;

requesting a broadcasting schedule information from a provider providing the broadcasting signal and a real-time popular search word from an external server of a portal website;

generating at least one recommended search word based on the broadcasting schedule information and the popular search word received from the server; and displaying the at least one generated recommended search word.

9. The method according to claim 8, further comprising displaying the information on at least one provider providing the broadcasting signal;

receiving a selection signal from the user to select one of the providers, wherein the requesting comprises requesting the broadcasting schedule information of the selected provider from the server.

10. The method according to claim 8, wherein the generating comprises generating the recommended search word from an information comprised in the broadcasting schedule information and in the popular search word.

11. The method according to claim 8, wherein the displaying the at least one recommended search word comprises displaying a plurality of recommended search words, and the method further comprising selecting one of the plurality of recommended search words.

12. The method according to claim 8, wherein the display apparatus further comprises a plurality of application units providing a plurality of contents, further comprising:

receiving a selection signal from a user to select one of the at least one recommended search words;

controlling the plurality of application units and individually searching the plurality of contents for contents relating to the selected recommended search word; and displaying a resultant search list based on the contents relating to the selected recommended search word.

13. The method according to claim 12, wherein the displaying the contents comprises displaying a search list of the contents relating to the selected recommended search word.

14. The method according to claim 13, further comprising executing a selected content from among the contents relating to the selected recommended search word if the selected content is selected from the search list.

15. A contents searching method of a display apparatus, the method comprising:

receiving a search signal from a user to execute a searching function;

identifying a location information of the display apparatus based on an Internet protocol and determining an information on at least one provider providing the broadcasting signal based on the location information;

requesting a broadcasting schedule information from a provider providing a broadcasting signal current being displayed and a real-time popular search word from an external server of a portal website;

generating a plurality of recommended search words based on the broadcasting schedule information and based on the popular search word received from the server;

displaying the generated recommended search words;

receiving a user selection from the user of one of the generated recommended search words; and displaying a plurality of contents based on the selected recommended search word.

* * * * *